United States Patent Office 3,516,942
Patented June 23, 1970

3,516,942
PROCESS FOR DRYING CAPSULE WALLS OF HYDROPHILIC POLYMERIC MATERIAL
Joseph A. Scarpelli, Dayton, Ohio, assignor to The National Cash Register Company, Dayton, Ohio, a corporation of Maryland
No Drawing. Filed Sept. 27, 1966, Ser. No. 582,257
Int. Cl. B01j 13/02
U.S. Cl. 252—316
3 Claims

ABSTRACT OF THE DISCLOSURE

A process is provided wherein water-swollen capsule walls of hydrophilic polymeric material are shrunk and dried. The process includes immersion of capsules having water-swollen walls in anhydrous hydroscopic glycol liquid. Such immersion causes withdrawal of the water from the capsule walls and results in individual capsules having dry, rigid walls.

---

This invention relates to a process for preparing, en masse, individual, rigid-walled, capsules having, as the capsule wall, dry hydrophilic, polymeric material. It more particularly pertains to a method for preparing such rigid-walled discrete capsules by the use of a hygroscopic liquid for the removal of absorbed water from water-swollen capsule wall material.

In the en masse preparation, in an aqueous manufacturing vehicle, of minute capsules having, ultimately rigid walls of dried hydrophilic polymeric material, the final process step consists of drying the capsule walls. The hydrophilic polymeric materials, when present in the manufacturing system as gelled but swollen capsule walls, may contain as much as 80 percent, by weight, water—water which must be removed if the capsules are to be isolated as rigid-walled, individual, entities. Separation of individual capsules, during their preparation, can be accomplished and adequately maintained by careful control of manufacturing liquid agitation, because the water-swollen capsule walls of hydrophilic polymeric materials, when existing in water as a slurry, exhibit very little tendency to adhere together with other capsule walls. However, when the capsule walls are being dried, a condition develops, at some certain degree of wall dryness, wherein the capsule walls become tenaciously adherent to one another; that is to say, in the process of drying, the walls become tacky.

Several methods have been developed for the treatment of capsule walls, and several capsule-wall-drying techniques have been investigated—all with the aim of alleviating the aforedescribed difficulty of capsule-wall-to-capsule-wall adhesion and the subsequent clumping or clustering of capsules.

Certain surface-active materials have been used to treat the walls of capsules in order to reduce their tendency to stick together. Treatment of capsule walls with surfactants is the subject of U.S. Pat. No. 3,436,452 "Treatment of Capsules in Liquid to Inhibit Clustering," issued Apr. 1, 1969, on the application of Theodore Maierson and assigned to the assignee herein.

The use of water-miscible, volatile, organic solvents as drying agents is well known. The most serious difficulty associated with use of such volatile and highly polar solvents is one of contamination of the capsule contents during the drying procedure. Due to processes not entirely understood, the volatile solvents—e.g., acetone and ethanol—rapidly "exchange," by diffusion through the capsule walls, with a capsular internal phase which is soluble in the organic solvent. During this exchange, the capsule walls are dried and rigid, but the intended internal phase is no longer pure, some of it being dissolved in the drying solvent and contained in capsules, and an equal amount of it being lost through the capsule walls.

Finely-divided, solid particles have been utilized in capsule drying by the technique of "dusting" water-swollen capsule walls. Swollen-walled capsules are slurried with the finely-divided solid—e.g., talc—in water and then are dried by evaporation in the air, the talc maintaining a physical barrier or separation between capsules and thereby reducing the tendency for capsule agglomeration. Such a treatment, with modification, is fully described in U.S. patent application Ser. No. 539,718, "Process for Preparation of Autogenously Reactant Minute Capsules," filed Apr. 4, 1966, now U.S. Pat. No. 3,467,544, in the names of Nicola Marinelli and John G. Whitaker and assigned to the assignee herein. The capsule-wall-drying procedure utilizing finely-divided solid particles cannot be used in cases where it is desired that the capsule walls be smooth and free from contamination, because there always remains, on the outer capsule surface, an adhering layer of the solid wall-treatment particles.

It is an object of this invention to provide a method for drying the hydrophilic polymeric walls of minute capsules by the use of hydroscopic liquids.

Another object of this invention is to provide a method for the drying of said capsule walls with the result that the capsule product is a pseudo-dry, free-flowing, powder but contains a major amount of some encapsulated internal phase, which may be a liquid.

Another object of this invention is to provide a method for the drying of capsule walls which walls are composed of hydrophilic, polymeric materials with the result that the capsule contents are less contaminated with the hygroscopic drying liquid than are the capsule contents when the capsules are dried with formerly-used volatile, organic liquid, capsule-wall-drying agents.

Another object of this invention is to provide a method for drying capsule walls with the result that the outer surfaces of said walls are smooth and glossy, with no solid-particle drying aid material adherent to the capsule walls.

With the above and other objects in mind, a complete description of the invention will now be given. Consideration of the description should make further objects of this invention apparent to those skilled in the art.

Surprisingly, it has been found that certain hydroxyl-containing materials can be used for drying capsule walls in the same manner as the previously-mentioned volatile organic solvents, which are apt to exchange through the capsule walls. The eligible drying materials useful in the practice of this invention are relatively non-volatile and are relatively non-polar when compared to the previously-used organic solvents. When used according to the teachings of this invention, capsules which have had their walls dried by the subject eligible drying materials suffer very little "exchange" of capsule contents with the drying liquid. Moreover, the resultant capsule characteristics are generally improved with respect to capsule wall strength and impermeability to loss of capsule contents by diffusion.

Although it has been found that the novel process is applicable to the drying of capsule walls composed of hydrophilic polymeric materials in general, and although the reasons for the excellence of the novel capsule-wall-drying system are not entirely understood, it has been found that in the specified and preferred embodiment of this invention, the drying material—a liquid glycol—acts, in addition to its desiccant action, to precipitate one or more of the dissolved wall materials. It is felt that the effect of this precipitation action is a substantial addition to the quality of capsule walls which have been dried by the novel method.

The hydrophilic, polymeric capsule wall materials which have been used in the practice of this invention include pigskin gelatin, gum arabic, succinylated calfskin gelatin, poly(ethylene-co-maleic anhydride), and carrageenan.

Although several hydroxyl-containing materials have been tested for use in the drying of water-swollen capsule walls, only one has been found which yields superior results. The materials tested have ranged from glycols to polyols and from low molecular weights to high. A few of the materials tested include 1,2-propanediol; 1,2-ethanediol; 2-methyl-2,4-pentanediol; 1,2,6-hexanetriol; 1,2,3-propanetriol; 1,2,3,4,5,6-hexanehexol (sorbitol); and polypropyleneglycol having about 1200 molecular weight. Other hydroxyl-containing materials have been found to operate with varying degrees of success, but anhydrous 2-methyl-2,4-pentanediol has been found to yield best results with regard to drying capsule walls without exchanging with the encapsulated material. The above material—2-methyl-2,4-pentanediol—in addition to removing water from swollen capsule walls and the precipitating some of the wall-forming components, also serves as a plasticizer for the capsule walls to reduce brittleness in the case of capsules whose walls have been chemically hardened during preparation.

Following is a specific example teaching the practice of this invention.

EXAMPLE I (PREFERRED)

Into a two-liter vessel, containing 800 milliliters of water and equipped with a heater and an agitator, were placed 180 milliliters of an 11 percent, by weight, aqueous solution of high Bloom strength pigskin gelation having an isoelectric point of pH 8 to 9—the solution being warm enough to be liquid (about 50 degrees centigrade)—and 180 milliliters of an 11 percent, by weight, aqueous solution of gum arabic. Agitation was initiated, the pH was adjusted to 4.5, and the temperature was adjusted to 40 degrees centigrade. The internal phase for this example—160 grams of toluene—was poured slowly into the vessel, and the agitation was adjusted until the desired toluene droplet size was obtained—300 to 500 microns in this case. To prepare capsules, the heater was turned off, and the temperature of the stirring liquid system was allowed to decrease from 40 to 25 degrees centigrade, at which time each toluene droplet had, as a casing, a swollen but gelled capsule wall of complex coacervate formed by the combination of gelatin and gum arabic in water solution. The stirring system was then placed in an ice bath and chilled to about 10 degrees centigrade, at which time 20 milliliters of a 25 percent, by weight, aqueous solution of pentanediol was slowly added to chemically harden the swollen capsule walls. The system was allowed to stir for about 16 hours, during which time the system temperature was allowed to return to ambient (about 25 degrees centigrade). After the hardening treatment, agitation was stopped to allow gravitational separation of the capsules from the manufacturing liquid, the manufacturing liquid was discarded, and the remaining capsule slurry was filtered on a vacuum filtration apparatus until the capsules formed a tightly-packed filter cake. The filter cake of capsules was then crumbled into pieces about 2 to 4 centimeters in diameter, and the pieces were added to a vigorously-stirring vessel containing, as the drying-treatment liquid, 2000 grams of anhydrous 2-methyl-2,4-pentanediol at about 25 degrees centigrade. After about five minutes, the agitation was stopped, and the system was again filtered on the vacuum filtration apparatus to separate capsules from the treatment liquid. The resultant filter cake of capsules having shrunken walls, without water present, was washed with n-hexane to remove any residual treatment liquid from the exterior capsule surfaces. The washing with n-hexane was twice repeated, and the resulting individual capsules, containing toluene and having water-free walls, were spread onto a laboratory bench to allow evaporation of residual n-hexane.

Although the temperature of the capsule-wall-drying system in this example was about 25 degrees centigrade, the temperature of the system is not important and can be varied over a wide range, being limited only by the freezing point of some component in the system or the temperature at which some one component boils or degrades.

The ratio of capsules having water-swollen walls to the amount of drying material can vary from 1:5 to 1:20 or more, the ratio being parts, by weight, of capsule filter cake (as in the example) to parts, by weight, of drying material. The range of ratios given is useful only as an approximation of relative amounts due to the different requirements resulting from possible differences in capsule size, capsule wall thickness, and capsule wall materials in different batches. Also, the various drying materials differ greatly in excellence of performance and, therefore, require different ratios of capsules to drying materials.

What is claimed is:

1. A process for preparing, en masse, minute individually separate capsules, each having, as a dry wall, water-swellable (hydrophilic) polymeric material, consisting of the following steps:
   (a) dispersing capsules having water-swollen walls into a stirred system of anhydrous 2-methyl-2,4-pentanediol,
   (b) maintaining said stirred system until substantially all of the water has been extracted from said capsule walls, and
   (c) separating the then-water-containing 2-methyl-2,4-pentanediol from the rigid-walled capsules.

2. The process of claim 1 wherein the ratio of capsules having water-swollen walls to the amount of anhydrous 2-methyl-2,4-pentanediol is from 1:5 to 1:20, by weight.

3. A process for preparing, en masse, minute individually separate capsules, each having rigid hydrophilic polymeric material as a capsule wall comprising the steps of:
   (a) filtering an aqueous dispersion of capsules having water-swollen walls of the hydrophilic polymeric material to yield a filter cake of the swollen-walled capsules;
   (b) adding the filter cake of capsules into a stirred system of anhydrous 2-methyl-2,4-pentanediol of 5 to 20 times, by weight, the amount of the added capsules; and
   (c) filtering the capsules from the then-water-containing 2-methyl-2,4-pentanediol.

References Cited

UNITED STATES PATENTS

| | | | |
|---|---|---|---|
| 2,226,487 | 12/1940 | Zink | 252—73 |
| 3,056,728 | 10/1962 | Ohtaki | 424—34 X |

FOREIGN PATENTS

| | | |
|---|---|---|
| 795,977 | 6/1958 | Great Britain. |

RICHARD D. LOVERING, Primary Examiner

U.S. Cl. X.R.

117—62, 62.2, 100; 264—342; 424—33, 34, 37

UNITED STATES PATENT OFFICE
CERTIFICATE OF CORRECTION

Patent No. 3,516,942  Dated  June 23, 1970

Inventor(s) Joseph A. Scarpelli

It is certified that error appears in the above-identified patent and that said Letters Patent are hereby corrected as shown below:

Column 1, line 16, "hydroscopic" should be --hygroscopic--; line 30, "ultimately rigid" should be --ultimately, rigid--. Column 2, line 24, "hydroscopic" should be --hygroscopic--. Column 3, line 21, "and the precipitating some" should be --and precipitating some--.

SIGNED AND SEALED
NOV 3 1970

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,516,942                                June 23, 1970

Joseph A. Scarpelli

It is certified that error appears in the above identified patent and that said Letters Patent are hereby corrected as shown below:

Column 3, line 52, "pentanediol" should read -- pentanedial --.

Signed and sealed this 16th day of February 1971.

(SEAL)
Attest:

Edward M. Fletcher, Jr.                       WILLIAM E. SCHUYLER, JR.
Attesting Officer                                Commissioner of Patents